United States Patent [19]
Diederich, Jr.

[11] Patent Number: 5,161,355
[45] Date of Patent: Nov. 10, 1992

[54] FILLER RAMP FOR FORAGE HARVESTER ROW CROP ATTACHMENTS

[75] Inventor: Anthony F. Diederich, Jr., Terre Hill, Pa.

[73] Assignee: Ford New Holland Inc., New Holland, Pa.

[21] Appl. No.: 665,051

[22] Filed: Mar. 6, 1991

[51] Int. Cl.$^5$ ............................................. A01D 45/02
[52] U.S. Cl. ......................................... 56/51; 56/119
[58] Field of Search .................... 56/98, 102, 59, 66, 56/75, 78, 82, 88, 93, 94, 119, 51, 53, 69, DIG. 9, DIG. 17

[56] References Cited
U.S. PATENT DOCUMENTS

| | | | |
|---|---|---|---|
| 3,670,482 | 6/1972 | Blanshine et al. | 56/98 |
| 4,300,335 | 11/1981 | Anderson | 56/119 |
| 4,397,134 | 8/1983 | Lausch et al. | 56/98 |

Primary Examiner—Terry Lee Melius
Attorney, Agent, or Firm—Frank A. Seemar; Larry W. Miller

[57] ABSTRACT

A row crop attachment for forage harvesters includes a plurality of row crop divider units arranged side-by-side on a base frame to define a plurality of crop conveying paths. Gathering chains are arranged to pass through each crop conveying path from an entrance to an exit thereof for conveying crop material through the crop conveying paths. Rotary knives are disposed adjacent the entrance of each crop conveying path for cutting off crop material before it is conveyed rearwardly through the crop conveying paths by the gathering chains. An auger is disposed adjacent the exits of the crop conveying paths for converging crop material exiting from the crop conveying paths toward a longitudinal center line of the row crop attachment. A filler ramp is positioned underneath the auger along this longitudinal center line behind the row crop divider units to prevent accumulation of crop material near the exits of the crop conveying paths.

6 Claims, 7 Drawing Sheets

FILLER RAMP FOR FORAGE HARVESTER ROW CROP ATTACHMENTS

BACKGROUND OF THE INVENTION

This invention relates generally to forage harvesters and, in particular, to forage harvester row crop attachments.

Row crop attachments for forage harvesters typically include a plurality of row crop divider units arranged side-by-side on a base frame to define a plurality of crop conveying paths through which gathering chains pass. Rotary knives are provided adjacent an entrance of each conveying path for cutting off crop material before it is conveyed rearwardly through the conveying paths by the gathering chains. As the crop material exits the conveying paths, an auger converges it toward a longitudinal center line of the row crop attachment so that it may be fed into feed rolls on the forage harvester. In row crop attachments with more than three crop conveying paths, some crop material tends to accumulate in front of the feed rolls along the longitudinal center line of the attachment thereby reducing efficiency.

SUMMARY OF THE INVENTION

The present invention is directed to a row crop attachment for a forage harvester including a plurality of row crop divider units arranged side-by-side on a base frame to define a plurality of crop conveying paths. Gathering chains pass through each crop conveying path from an entrance to an exit thereof for conveying crop material rearwardly through the crop conveying paths. Rotary knives are provided adjacent the entrance of each crop conveying path for cutting off crop material before it is conveyed rearwardly through the crop conveying path by the gathering chains. An auger is disposed adjacent the exits of the crop conveying paths for converging crop material exiting the crop conveying paths toward a longitudinal center line of the row crop attachment. A filler ramp is positioned underneath the auger along this longitudinal center line behind the row crop divider units for preventing accumulation of crop material near the exits of the crop conveying paths.

DESCRIPTION OF THE PREFERRED EMBODIMENT

Figure 1:
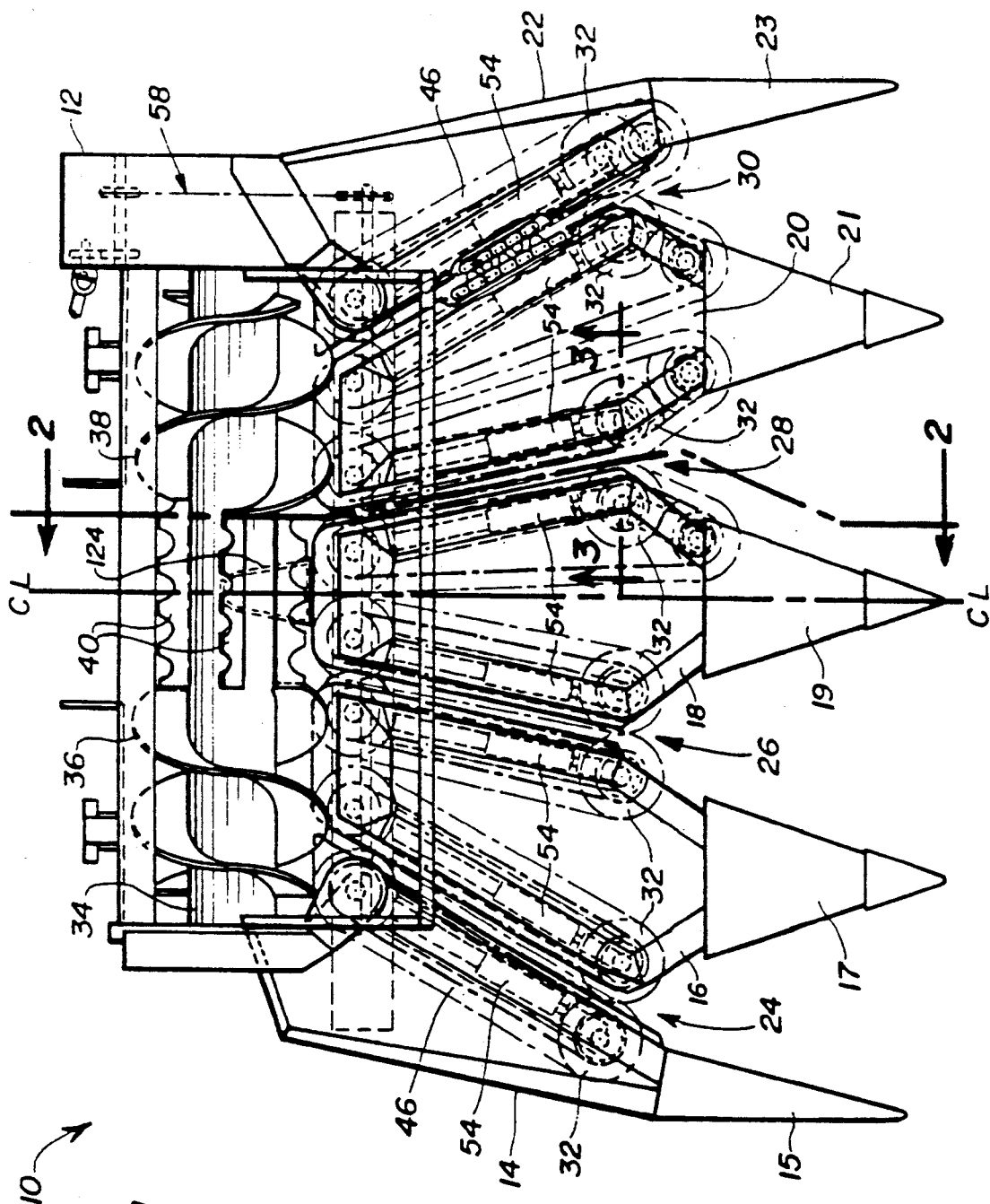
FIG. 1 is a front perspective view of a row crop attachment for forage harvesters incorporating the preferred embodiment of the present invention.
Figure 2:
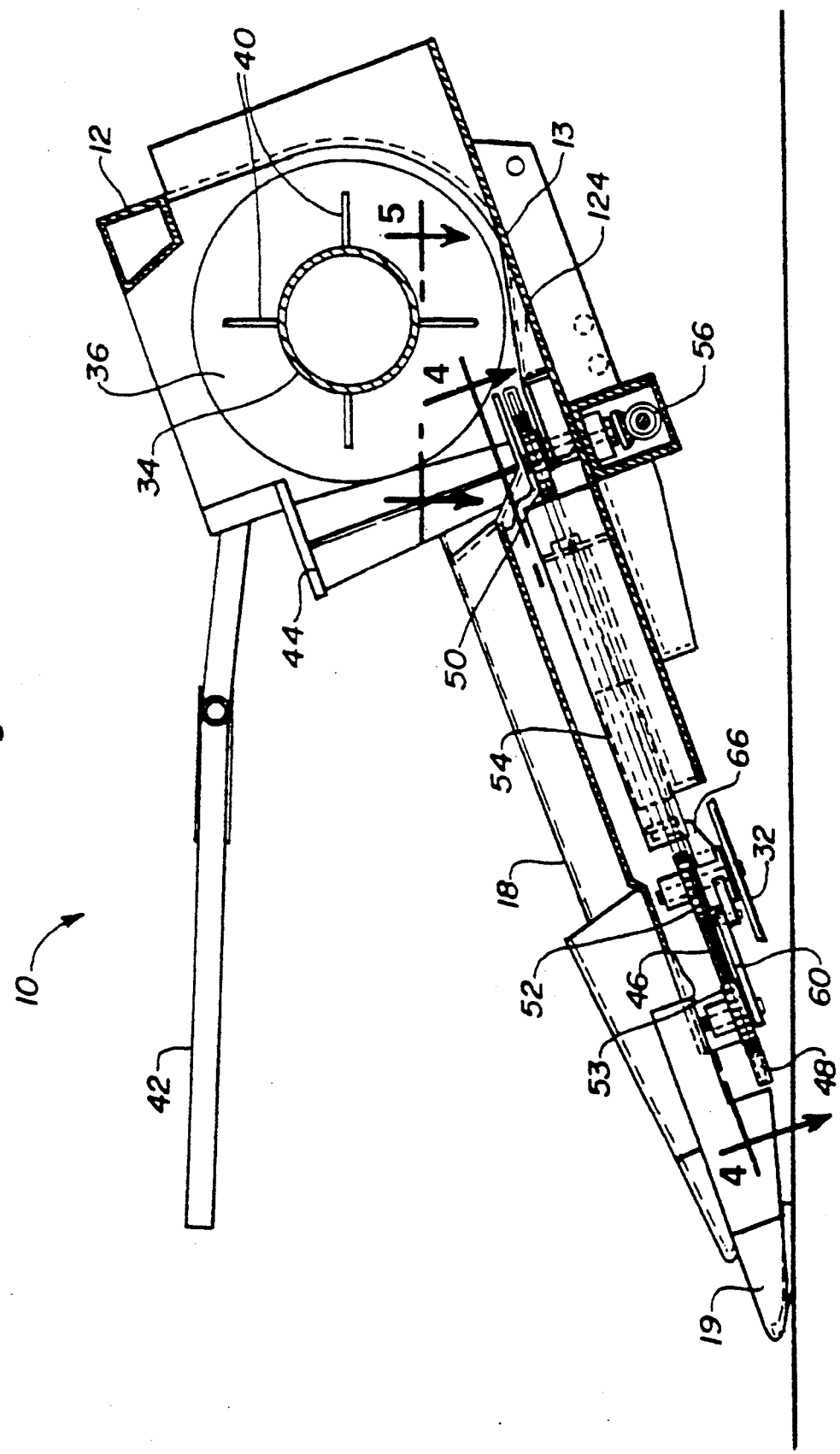
FIG. 2 is a sectional view taken along lines 2—2 in FIG. 1.

Referring to FIGS. 1 and 2, a row crop attachment 10 has a base frame 12 adapted for mounting on a forage harvester (not shown). The attachment 10 includes a plurality of row crop divider units 14, 16, 18, 20 and 22 arranged side-by-side On base frame 12 to define crop conveying paths 24, 26, 28 and 30 through which crop material is conveyed. Disposed adjacent an entrance to each of the conveying paths 24, 26, 28 and 30 are a pair of counterrotating knives 32 with cooperating cutting edges for cutting off crop material near the ground before it is conveyed rearwardly through the conveying paths. An exit of each of the conveying paths 24, 26, 28 and 30 is disposed adjacent a converging auger 34 which is mounted above a floor 13 in the base frame 12. As viewed in FIG. 1, the auger 34 has opposed flighting 36 and 38, respectively, for converging crop material exiting from the conveying paths 24, 26, 28 and 30 toward centrally disposed paddles 40 on the auger 34. Paddles 40 feed crop material rearwardly into feed rolls (not shown) of a forage harvester where it is processed in a conventional manner. The attachment 10 also includes a stalk guide 42 and feed assist rollers 44 for the purposes described in U.S. Pat. No. 4,512,527 to J. E. Shriver et al and U.S. Pat. No. 4,901,510 to J. R. McClure et al. Snouts 15, 17, 19, 21 and 23 are attached to the leading ends of the divider units 14, 16, 18, 20 and 22, respectively.

Figure 5:
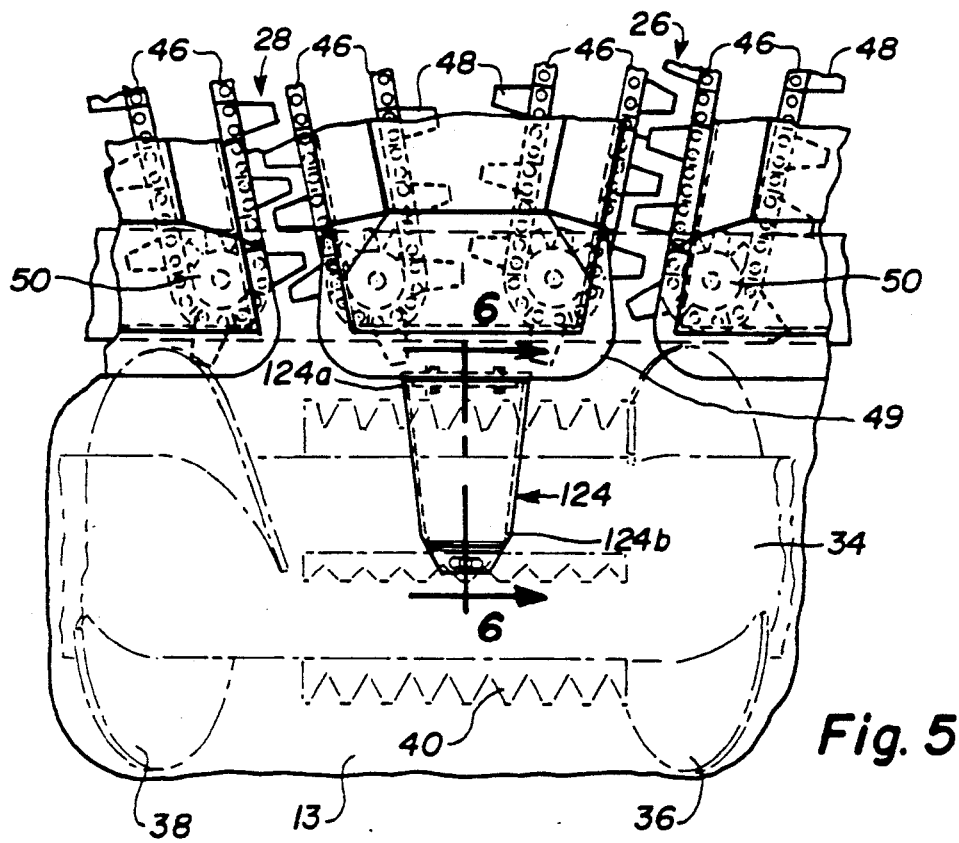
FIG. 5 is a sectional view taken along lines 5—5 in FIG. 2.

A pair of gathering chains 46 with cooperating lugs 48 pass through each of the conveying paths 24, 26, 28 and 30 from the entrance to the exit thereof in order to convey crop material through the conveying paths 24, 26, 28 and 30. Each gathering chain 46 is wrapped around a drive sprocket 50 and one or two idler sprockets 52, 53. Stripper plates 49, best shown in FIG. 5, are located above the drive sprockets 50 for stripping crop material from the lugs 48 of the gathering chains 46. Adjustment mechanisms 54 are provided for tensioning and taking up slack in the gathering chains 46. The drive sprockets 50 are powered by a bevel gear arrangement 56 which receives its power from a drive line 58 that is connected to the forage harvester. As seen in FIG. 1, the gathering chains 46 passing through each of the conveying paths 24 and 26 (i.e. left of longitudinal center line CL) are in a non-extended configuration where a drive sprocket 50 and one idler sprocket 52 are employed while the gathering chains 46 passing through each of the conveying paths 28 and 30 (i.e. to the right of longitudinal center line CL) are in an extended configuration where a drive sprocket 50 and two idler sprockets 52, 53 are used. It will be understood that the gathering chains 46 are shown in this combination of non-extended and extended configurations only for purposes of illustration. During normal operation of the row crop attachment 10, all of the gathering chains 46 would be in either the non-extended or the extended configuration.

Figure 4:
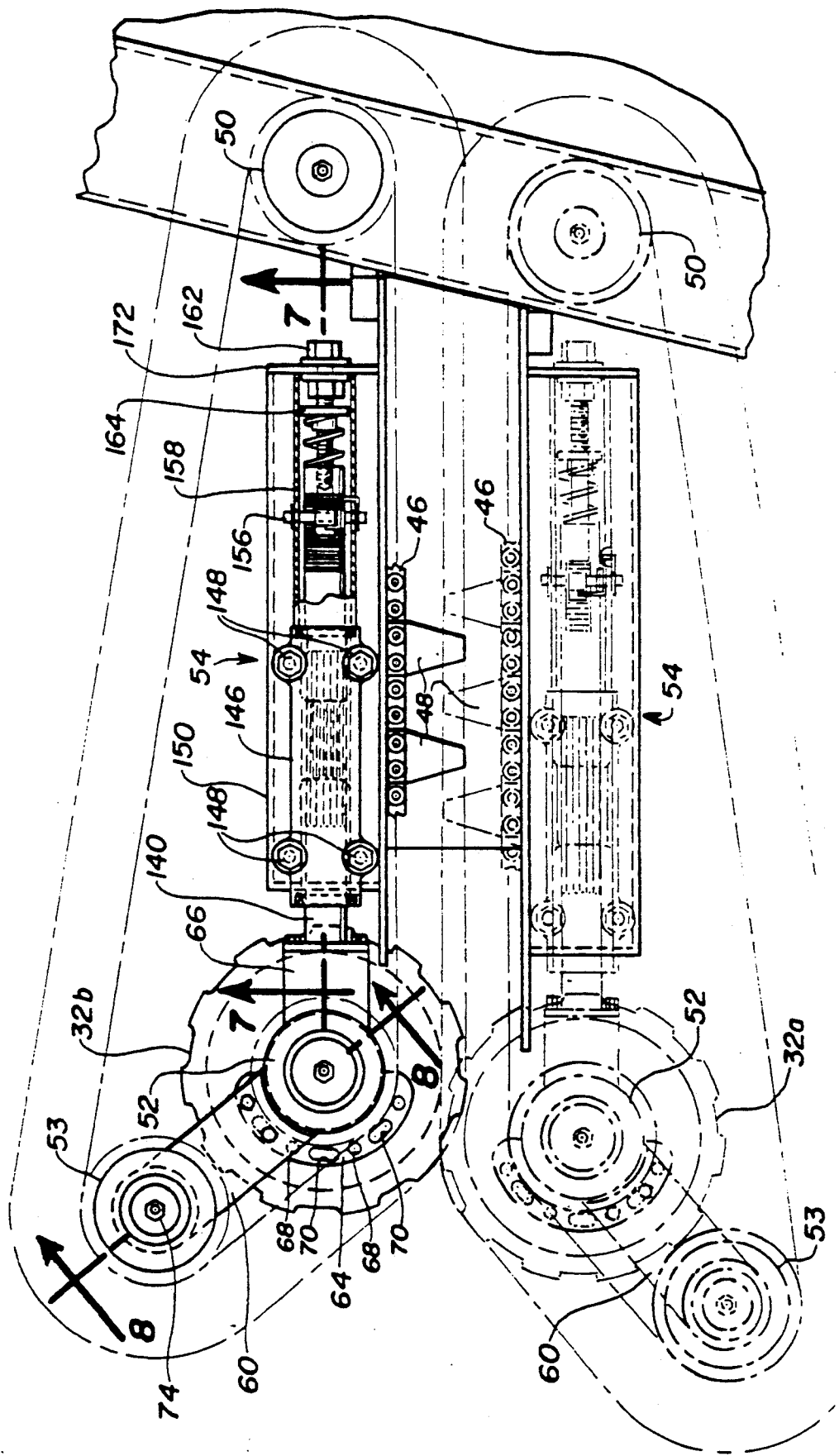
FIG. 4 is an enlarged sectional view taken along lines 4—4 in FIG. 2.
Figure 8:
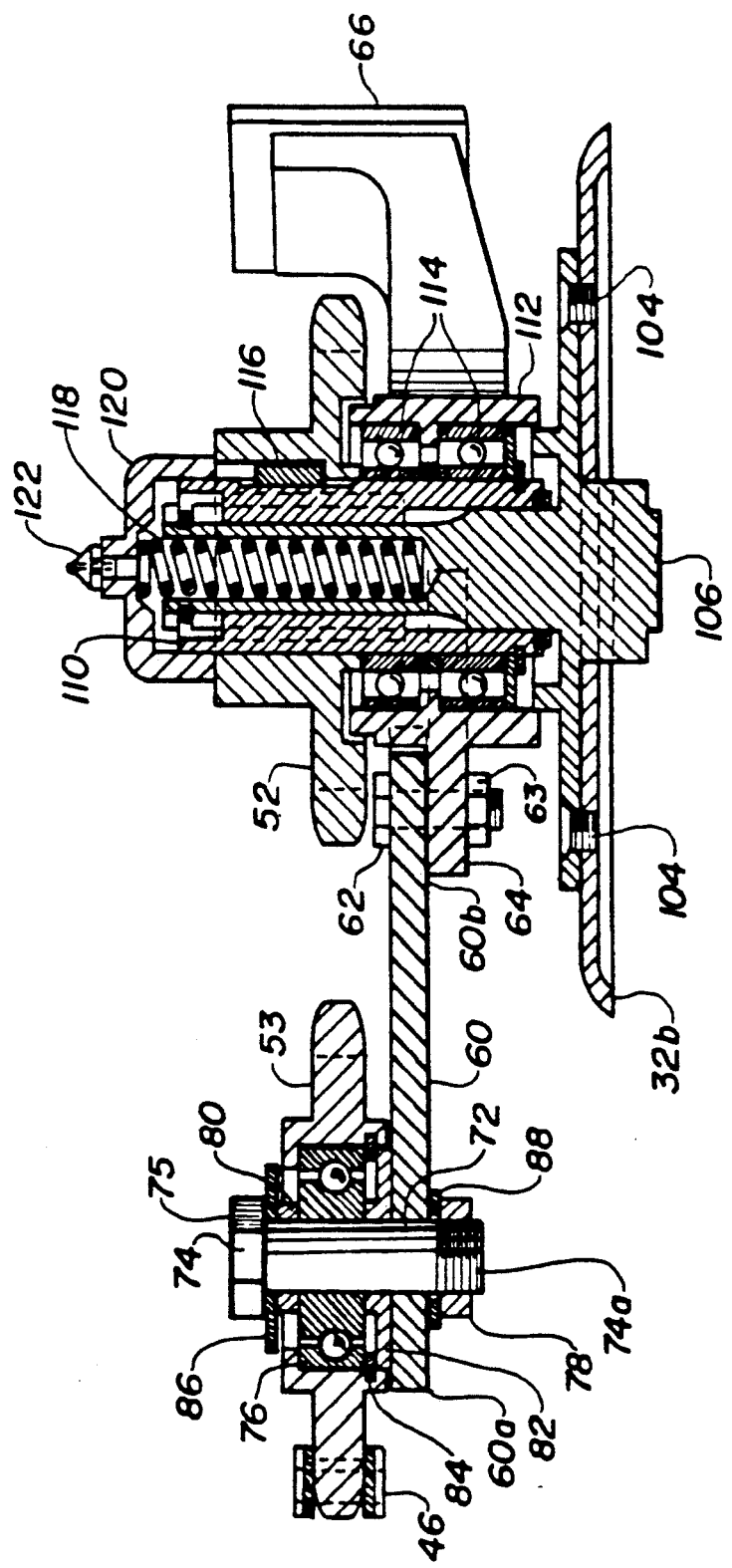
FIG. 8 is an enlarged sectional view taken along lines 8—8 in FIG. 4.

By utilizing bars 60 best shown in FIGS. 2, 4 and 8, the gathering chains 46 may be easily and quickly converted between their non-extended and extended configurations. Each bar 60 supports an idler sprocket 53 in cantilevered manner at its outer end 60a while being fastened by bolts 62 and nuts 63 at its inner end 60b to a flange 64 which is formed on framework 66. The flanges 64 each have a series of alternating circular holes 68 and elongated slots 70 formed therein so that the bars 60 may be used universally to convert any of the gathering chains 46 from the non-extended to the extended configuration. The outer end 60a of each bar 60 has a hole 72 for receiving a bolt 74 on which an idler sprocket 53 is rotatably mounted via a bearing 76. Nuts 78 are threaded onto the lower ends 74a of bolts 74 to secure the idler sprockets 53 to the bars 60. Upper and lower spacer members 80 and 82, respectively, support the bearings 76. A retaining ring 84 is mounted in a groove in each idler sprocket 53 and is sandwiched between an associated bearing 76 and lower spacer member 82. Washers 86 are disposed between the heads 75 of bolts 74 and the upper spacer members 80. Disposed between the bars 60 and the nuts 78 are washers 88.

Figure 3:
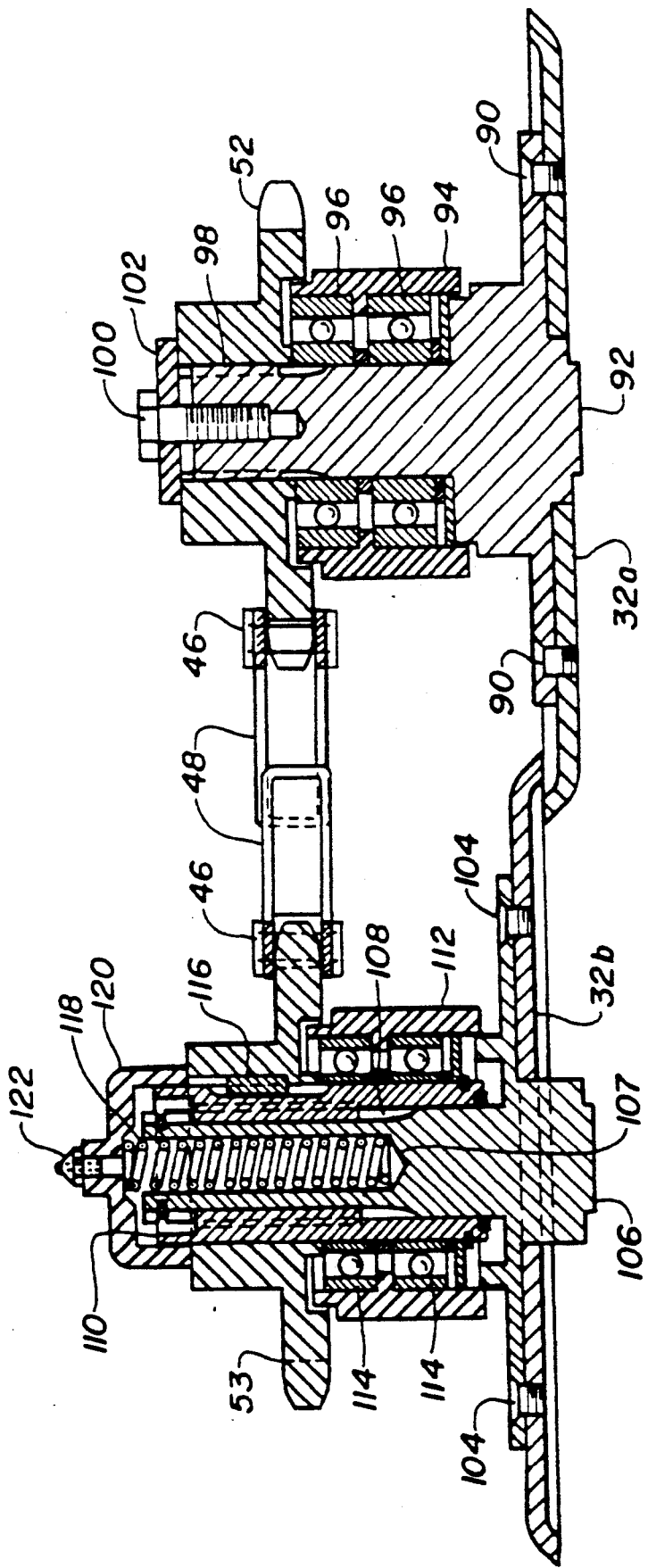
FIG. 3 is an enlarged sectional view taken along lines 3—3 in FIG. 1.

Referring now particularly to FIG. 3, a mounting arrangement for each pair of knives 32a, 32b is illustrated in cross-section. Lower knife 32a is fastened by screws 90 to a hub 92 that is rotatably mounted in a portion 94 of framework 66 by roller bearings 96. A gathering chain idler sprocket 52 is connected to the hub 92 by mating splines 98 so that the idler sprocket 52 and the hub 92 rotate in unison. A bolt 100 extends through a washer 102 into the hub 92 to secure the idler sprocket 52 on the hub 92. Upper knife 32b is fastened by screws 104 to a hub shaft 106 that has a splined connection 108 with a sleeve 110 rotatably supported in a portion 112 of framework 66 via roller bearings 114. Sleeve 110 is connected to a gathering chain idler sprocket 53 by a key 116 so that the sleeve 110, idler sprocket 53 and hub shaft 106 rotate in unison. Disposed in a central bore 107 in the hub shaft 106 is a compression spring 118 urging the hub shaft 106 and the attached knife 32b in a downward direction. Spring 118 thus insures that the cutting edges 33 of knives 32a and 32b will be maintained in contact with each other to provide the desired shearing action. A cap 120 is threaded onto an upper end of the sleeve 110 to retain the spring 118, and a grease fitting 122 is provided on the cap 120 for lubrication.

One important feature of the splined connection 108 as shown in FIG. 3 is that the splines in the hub shaft 106 are longer than the splines in the sleeve 110 thereby permitting limited upward and downward movement of the hub shaft 106 and the attached upper knife 32b. This prevents the knives 32a, 32b from locking up and possibly damaging other parts of the attachment 10. Another important feature of the splined connection 108 is that the mating splines on hub shaft 106 and sleeve 110 are square sided which prevents the hub shaft 106 and the attached upper knife 32b from wobbling during operation of the attachment 10.

Figure 6:
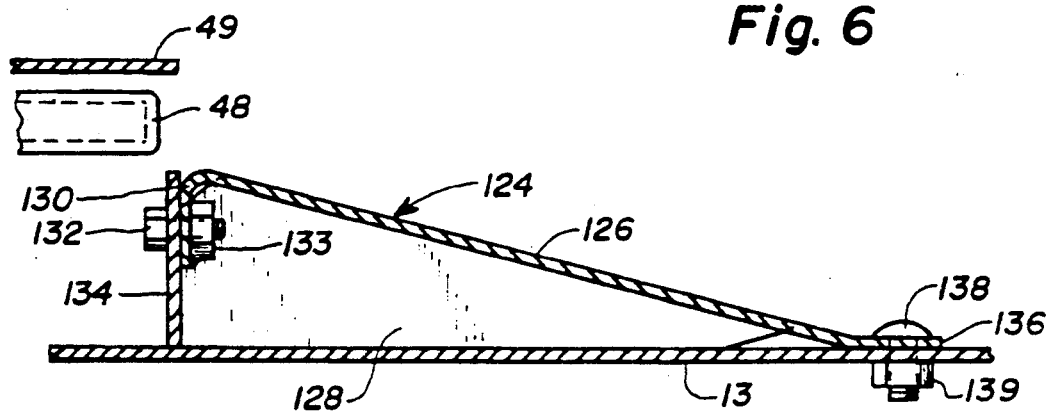
FIG. 6 is an enlarged sectional view taken along lines 6—6 in FIG. 5.

Referring now in particular to FIGS. 5 and 6, a filler ramp 124 is positioned underneath auger 34 on the floor 13 of base frame 12 behind the divider unit 18 and adjacent the exits of the crop conveying paths 26 and 28. The ramp 124 has a top wall 126 and a pair of side walls 128. A flange 130 at one end of the ramp top wall 126 is attached by bolts 132 and nuts 133 to a support member 134 while another flange 136 at the other end of the ramp top wall 126 is secured to the floor 13 by a bolt 138 and a nut 139. When viewed from above as in FIG. 5, filler ramp 124 is wider at its front end 124a than at its rear end 124b thereby resulting in the ramp 124 being tapered in width from its front end 124a to its rear end 124b. In side elevation view as seen in FIG. 6, top wall 126 of ramp 124 slopes downwardly from front to rear. During operation of the attachment 10, ramp 124 improves the feeding of crop from the conveying paths 26, 28 into the auger 34 by preventing buildup of crop in the space between the exits of the conveying paths 26, 28. With ramp 124 installed as shown in FIGS. 5 and 6, the auger 34 has increased aggressiveness near the center line CL of the attachment 10.

Figure 7:
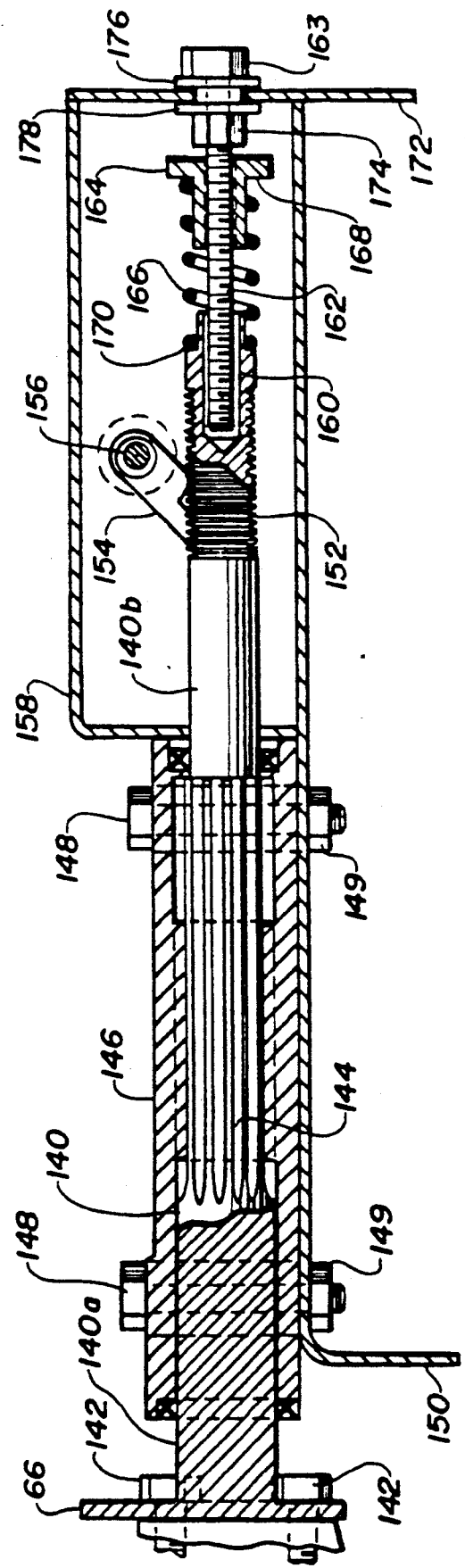
FIG. 7 is an enlarged sectional view taken along lines 7—7 in FIG. 4.

As best seen in FIGS. 4 and 7, the adjustment mechanisms 54 for the gathering chains 46 each include a shaft 140 attached at one end 140a by bolts 142 to the framework 66 of base frame 12. Shaft 140 extends through and has a splined connection 144 with a housing 146. Bolts 148 and nuts 149 mount the housing 146 to a base frame member 150. The shaft 140 has circumferential grooves 152 at the other end 140b engaged by a pawl 154 that is rotatably mounted on a shaft 156 which extends between the sides of a cover 158. Extending into a bore 160 in the shaft 140 is an adjusting bolt 162 onto which a fitting 164 is threaded. A spring 166 is held in compression between a shoulder 168 on the fitting 164 and a shoulder 170 on the shaft 140. Adjusting bolt 162 extends through a hole in a support member 172, and a jam nut 174 is engaged with the adjusting bolt 162. A washer 176 is disposed between adjusting bolt head 163 and support member 172, and another washer 178 is disposed between jam nut 174 and support member 172. A spacer 180 on adjusting bolt 162 is located between washers 176, 178 to permit rotation of adjusting bolt 162. As seen in FIG. 7, spacer 180 is thicker than support member 172.

When the gathering chains 46 require adjustment to increase tension or take up slack therein, the adjusting mechanisms 54 are operated as follows. Adjusting bolt 162 is rotated in a direction to cause movement of the fitting 164 away from frame member 172 which results in the shaft 140 being moved toward the left in FIG. 7 relative to housing 146 due to splined connection 144. This moves framework 66 and idler sprockets 52, 53 away from drive sprocket 50 thereby tensioning the gathering chain 46. The shaft 140 is held in its adjusted position by the pawl 154 which engages the grooves 152 in the end 140b of shaft 140.

What is claimed is:

1. In a forage harvester row crop attachment including a base frame, a plurality of row crop divider units arranged side-by-side on said base frame to define a plurality of crop conveyed paths from an entrance to an exit thereof, rotary knives disposed adjacent the entrance of each of said crop conveying paths for cutting off crop material before it is conveyed rearwardly through said crop conveying paths by said gathering chains, an auger disposed adjacent the exits of said crop conveying paths for converging crop material exiting from said crop conveying paths toward a longitudinal center line of the row crop attachment, said auger having centrally disposed means for urging a conveyed crop material rearwardly along a path in the vicinity of said center line, an improvement comprising:
 a filler ramp positioned underneath said centrally disposed means of said auger and along said longitudinal center line behind said row crop divider units to prevent accumulation of conveyed crop material near the exits of said crop conveying paths and to enhance the ability of said centrally disposed means to urge said conveyed crop material rearwardly.

2. The improvement of claim 1, wherein said filler ramp has a top wall which slopes downwardly from a front end of said filler ramp to a rear end of said filler ramp, said front end being disposed closer to said exits of said crop conveying paths than said rear end, and generally vertical side walls to provide a barrier for material being conveyed toward said center line.

3. The improvement of claim 2, wherein said filler ramp is wider at its front end than at its rear end whereby said filler ramp is tapered in width from its front end to its rear end to deflect converging material in a rearward direction.

4. A forage harvester row crop attachment comprising, a base frame,
 at least five row crop divider units arranged side-by-side on said base frame to define at least four crop conveyed paths,
 gathering chains arranged to pass through each of said crop conveying paths from an entrance to an exit thereof,
 rotary knives disposed adjacent the entrance of each said crop conveying paths for cutting off crop material before it is conveyed rearwardly through said crop conveying paths by said gathering chains,
 an auger disposed adjacent the exits of said crop conveying paths for converging crop material exiting from said crop conveying paths toward a longitudinal center line of the row crop attachment, said auger having centrally disposed means for urging conveyed crop material rearwardly along a path in the vicinity of said center line, the improvement comprising a filler ramp positioned underneath said centrally disposed means of said auger and along said longitudinal center line directly behind the centermost row crop divider unit to prevent accumulation of conveyed crop material in a space between the exits of the two centermost crop conveying paths and to enhance the ability of said centrally disposed means to urge said conveyed crop material rearwardly.

5. The forage harvester row crop attachment of claim 4, wherein said filler ramp has a top wall which slopes downwardly from a front end of said filler ramp to a rear end of said filler ramp, said front end being disposed closer to said centermost row crop divider unit than said rear end.

6. The forage harvester row crop attachment of claim 5, wherein said filler ramp is wider at its front end than at its rear end whereby said filler ramp is tapered in width from its front end to its rear end.

* * * * *